United States Patent [19]
Altares, Jr.

[11] 3,819,546
[45] June 25, 1974

[54] ANTILUMPING EXPANDABLE STYRENE POLYMERS
[75] Inventor: Timothy Altares, Jr., Valencia, Pa.
[73] Assignee: Arco Polymers, Inc., Pittsburgh, Pa.
[22] Filed: May 9, 1973
[21] Appl. No.: 358,531

[52] U.S. Cl. .......... 260/2.5 B, 117/100 C, 260/892, 260/898, 260/899, 260/901
[51] Int. Cl. .......................... C08j 1/26, B44d 5/00
[58] Field of Search ................................ 260/2.5 B

[56] References Cited
UNITED STATES PATENTS
3,428,579   2/1969   Stahnecker et al. ............. 260/2.5 B
3,462,293   8/1969   Voris ............................... 260/2.5 B Primary Examiner—Murray Tillman
Assistant Examiner—Morton Foelak
Attorney, Agent, or Firm—Dr. Lewis J. Young

[57] ABSTRACT

Expandable styrene polymer particles are surface-coated with poly(methyl methacrylate) to prevent the particles from lumping together during expansion. The coating is applied by adding 0.03–0.30 part of poly(methyl methacrylate) to an aqueous suspension of tricalcium phosphate prior to the addition of 100 parts of polymer particles and prior to impregnating the mixture with a blowing agent.

2 Claims, No Drawings

ANTILUMPING EXPANDABLE STYRENE POLYMERS

BACKGROUND OF THE INVENTION

This invention relates to a process for making expandable styrene polymer particles non-lumping on pre-expansion.

The making of low density, cellular, shaped, plastic articles from expandable particles of styrene polymers is well-known. Such particles generally contain a blowing agent which boils below the softening point of the polymer and which will cause the particles to expand when they are heated.

The particles are generally pre-expanded before introduction into the mold to provide better fusion and less density variation in the molded article. Such a pre-expansion is described in U.S. Pat. No. 3,023,175 and U.S. Pat. No. 3,577,360.

These pre-expanded particles are placed into a mold cavity which defines the shape of the desired finished article. The particles are heated above their softening point, whereupon the particles expand to fill the mold cavity and fuse together.

An undesirable result of the pre-expansion before introduction into the mold is the tendency of the pre-expanded particles to clump together and from lumps which render the particles unsuitable for molding. These lumps cannot be properly conveyed in processing plants and are unsuitable for charging into molds of intricate contour due to improper fill-out of the molded articles. Even if reasonable fill-out is achieved, variations in density within the molded article can result and voids also occur.

Various methods have been proposed for the prevention of lumping during pre-expansion, but these have all suffered from some objectionable feature such as rapid loss of blowing agent, poor flow of the treated beads, dust problems which cause plugging of the steam ports, and often serious reduction in fusion of the particles on molding. U.S. Pat. No. 3,520,833, teaches the addition of lecithin during the impregnation of the particles with the blowing agent. Unfortunately the lecithin imparts an undesirable odor to the molded articles. U.S. Pat. No. 3,462,293, teaches to coat the particles with polymeric materials by a fluid bed process. This process involves an additional expense of fluidizing the particles and coating with the polymer latexes.

SUMMARY OF THE INVENTION

It has now been found that anti-lumping, pre-expanded particles are produced by coating styrene polymer particles with a poly(methyl methacrylate) applied to the particles in an aqueous suspension prior to impregnating the particles with expanding agent. The methacrylate must be added to the suspension system prior to the addition of the styrene polymer particles.

DETAILED DESCRIPTION OF THE INVENTION

In accordance with this invention, a variety of expandable thermoplastic homopolymers and copolymers can be rendered anti-lumping. The polymers may be derived from vinyl aromatic monomers including styrene, vinyltoluene, isopropylstyrene, alpha-methylstyrene, nuclear methylstyrenes, chlorostyrene, tertbutylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as in U.S. Pat. No. 2,983,692, by suspending the particles in water with the aid of suspending agent systems such as tricalcium phosphate in combination with an anionic surfactant.

In the process of the invention, the tricalcium phosphate, the anionic surfactant, and water are mixed and thoroughly agitated to form a dispersion. The poly(methyl methacrylate) is then added to the dispersion and agitated. The polymer particles and the blowing agent are then added and the resulting suspension heated to impregnate the particles with the blowing agent and coat the particles with the methacrylate polymer. After cooling the particles to room temperature, acidifying the slurry with hydrochloric acid, separating the particles from the aqueous medium, and washing them, the particles are dried to produce expandable styrene polymer particles which will not lump together on pre-expansion with heat.

The poly(methyl methacrylate) is used in amounts of from 0.03 to 0.30 part per 100 parts of polymer particles. The methacrylate may be conveniently used as an aqueous latex having 30–40 per cent solids.

The order of addition of the surfactant, phosphate, and poly(methyl methacrylate) is not important so long as these ingredients are mixed prior to the addition of the polymer particles.

The blowing agents are compounds which are gases or which will produce gases on heating. Preferred blowing agents include aliphatic hydrocarbons containing from 1–7 carbon atoms in the molecule, such as methane, ethane, propane, butane, pentane, cyclopentane, hexane, heptane, cyclohexane, and their halogenated derivatives which boil at a temperature below the softening point of the polymer. Mixtures of these agents may also be used, such as a mixture of 40–60% n-pentane and 60–40% trichlorofluoromethane. Usually from 3 to 20% of blowing agent per 100 parts of polymer is incorporated by the impregnation.

The impregnation is conventionally carried out at temperatures ranging from about 60° to 150° C. Increasing the temperature makes the impregnation proceed at a faster rate.

After the impregnation is completed, the suspension of polymer particles is cooled to room temperatures to allow separation of the impregnated beads from the aqueous phase.

The coated, impregnated particles are separated from the aqueous phase by the usual means, such as centrifugation after acidification with hydrochloric acid. The particles are then washed with water and dried.

It will be obvious to those skilled in the art that the coating process of the present invention may also be applied to polymer particles which contain various other additives, such as dyes, pigments, self-extinguishing agents, anti-static agents, plasticizers or the like.

The invention is further illustrated by the following examples wherein parts are parts by weight unless otherwise indicated.

EXAMPLE I

To a 12-ozo crown capped bottle was added in sequence 100 parts of water, 0.0047 part of sodium dodecylbenzene sulfonate, 0.05 part of poly(methyl methacrylate) (added as aqueous latex having about 30% solids), and 2.0 parts of tricalcium phosphate. The mixture was stirred for several minutes to insure complete mixing. There was then added 100 parts of polystyrene particles having a particle size of predominately through 16 and on 35 mesh, U.S. Standard Sieve, and 9.0 parts of n-pentane. The bottle was then opened and the contents acidified with HCl. The particles were separated from the water, washed with water, and dried.

A control sample was prepared using the identical procedure except that the methacrylate polymer latex was omitted.

The beads from the control sample were pre-expanded in a Rodman Pre-Expander (U.S. Pat. No. 3,023,175) to a density of about 1.25 p.c.f. The control beads were found to have in excess of 50% lumps.

Similar treatment of the beads treated with the poly(methyl methacrylate) gave pre-expanded beads having no lumps (<0.05%).

Examination of the beads treated with poly(methyl methacrylate) under an electron scanning microscope showed that the beads were evenly coated on their surface with the poly(methyl methacrylate).

EXAMPLE II

The process of Example I was repeated using amounts of poly(methyl methacrylate) latex varying from 0.03 to 0.3 parts per 100 parts of polystyrene beads. In all cases, the pre-expanded products contained no lumps.

EXAMPLE III

To illustrate the necessity of mixing the suspending agent system with the methacrylate polymer before adding the styrene polymer particles, two runs were made as follows:

A. To a 12-oz. crown capped bottle was added, sequentially, 100 parts of water, 0.0025 part of sodium dodecylbenzene sulfonate, 0.075 part poly(methyl methacrylate) (added as a latex having about 40% solids), 1.2 parts of tricalcium phosphate, 100 parts of polystyrene beads (as in Example I), and 9.0 parts n-pentane. After each addition, the mixture was stirred vigorously to insure good dispersion of the ingredients. The bottle was then capped and heated with end-over-end agitation for 2 hours at 110° C.

B. To a 12 oz. crown capped bottle was added, sequentially, 100 parts of water, 0.0025 part of sodium dodecylbenzene sulfonate, 1.2 parts of tricalcium phosphate; and 100 parts of polystyrene beads. The mixture was stirred vigorously after each addition. The bottle was capped and heated to 70° C. with agitation; then cooled, opened and 0.075 part of poly(methyl methacrylate) and 9.0 parts of n-pentane added. The bottle was then recapped and heated for 2 hours at 110° C. with agitation.

On recovery of the beads from the two runs, A and B, the beads were pre-expanded as in Example I. The beads from run A had no lumps, whereas those from run B had in excess of 80% lumps.

What is claimed is:

1. In a process for making expandable styrene polymer particles by suspending styrene polymer particles in water containing a difficultly water-soluble inorganic suspending agent which may be extended by a surface-active agent and thereafter impregnating said particles with a blowing agent, the improvement comprising: adding to the water, prior to adding the polymer particles, from 0.03 to 0.3 parts of poly(methyl methacrylate) solids per 100 parts of polymer particles, whereby the expandable particles are coated with the methacrylate polymer.

2. The process of claim 1 wherein said poly(methyl methacrylate) is in the form of an aqueous latex having 30–40% solids.

* * * * *